(12) United States Patent
Quintana

(10) Patent No.: US 10,342,216 B2
(45) Date of Patent: Jul. 9, 2019

(54) PROTECTIVE GARMENT FOR ANIMALS

(71) Applicant: Leah Bernadette Quintana, Cedar Creek, TX (US)

(72) Inventor: Leah Bernadette Quintana, Cedar Creek, TX (US)

( * ) Notice: Subject to any disclaimer, the term of this patent is extended or adjusted under 35 U.S.C. 154(b) by 51 days.

(21) Appl. No.: 14/974,080

(22) Filed: Dec. 18, 2015

(65) Prior Publication Data

US 2017/0172107 A1 Jun. 22, 2017

(51) Int. Cl.
*A01K 13/00* (2006.01)

(52) U.S. Cl.
CPC .................. *A01K 13/006* (2013.01)

(58) Field of Classification Search
CPC .................................... A01K 13/006
See application file for complete search history.

(56) References Cited

U.S. PATENT DOCUMENTS

| 5,906,004 | A * | 5/1999 | Lebby | A41D 31/00 |
| | | | | 139/425 R |
| 9,370,166 | B1 * | 6/2016 | Ford | A01K 13/006 |
| 2002/0098312 | A1 * | 7/2002 | Sloot | A41D 13/01 |
| | | | | 428/45 |
| 2003/0061790 | A1 * | 4/2003 | Longtin | A01K 13/00 |
| 2007/0281136 | A1 * | 12/2007 | Hampden-Smith | B41M 1/22 |
| | | | | 428/195.1 |
| 2010/0277945 | A1 * | 11/2010 | Hurwitz | A01K 13/003 |
| | | | | 362/570 |
| 2011/0155077 | A1 * | 6/2011 | Hurwitz | A01K 13/006 |
| | | | | 119/850 |
| 2011/0203783 | A1 * | 8/2011 | Blackford | A41D 31/0038 |
| | | | | 165/185 |
| 2016/0262462 | A1 * | 9/2016 | Kawamura | A01K 13/006 |

OTHER PUBLICATIONS

Holographic, Nov. 9, 2014, https://www.vocabulary.com/dictionary/holographic (Year: 2014).*

* cited by examiner

*Primary Examiner* — Kristen C Hayes
(74) *Attorney, Agent, or Firm* — Eric Churilla

(57) ABSTRACT

A protective garment for animals to reduce the possibility that the animal will be attacked by a bird of prey. The garment may include a central portion with flaps extending from opposite sides of the central portion. The flaps may be fastened together around the chest and stomach of the animal. Additional flaps may be provided to secure the garment around the animal's neck. The material used on the central portion of the garment is a holographic material that that shimmers in light and disorients and confuses a bird of prey to avoid the bird of prey attacking the animal. Battery powered lights, such as LED lights, may be provided to illuminate the holographic material during low light conditions.

17 Claims, 7 Drawing Sheets

PROTECTIVE GARMENT FOR ANIMALS

BACKGROUND

Raptors are birds of prey. They are carnivorous birds with strong bills, large talons and exceptional flight capabilities that hunt small animals. There are more than five hundred species of raptors worldwide. Different species of raptors can be found in every type of habitat, from frozen tundras and scorching deserts to dense forests and bustling cities.

The Latin word "raptor" means "to plunder, snatch or seize". Raptors are characterized by a hooked beak, razor-sharp talons on strong feet and excellent eyesight. They hunt with their large strong talons and sharply hooked bills. Most raptors capture exclusively live prey. Large raptors will routinely attack animals that weigh up to twenty pounds as part of a hunt, and many birds of prey will attack even larger animals if the bird feels its nest or young is threatened. Even though animals heavier than twenty pounds cannot physically be picked up by most birds of prey small pets are often harmed or killed by birds attempting to take them.

Different types of raptors have varying ways to kill their pretty. A hawk kills its prey with its claws as wile a falcon uses its claws to catch its prey but kills the small animal with its mouth instead of its claws. But all capture their prey with the talons on their powerful feet. Feet are often the primary weapons of death, and protection, for raptors. The talon on the back toe is long. The size of a raptors foot varies with the size of its prey: rodent hunters generally have short, stout toes, while bird hunters have long, thin toes to increase their grasping area. Their quite large and powerful feet can exert enough pressure to puncture thick skin, often crushing and killing prey instantly. Once a raptor catches something, the bird generally will not release it until the prey stops moving. For example, red-tailed hawk talons can apply up to two hundred pounds per square inch of pressure, whereas the average human hand can only apply about ninety pounds. A golden eagle that weighs about nine pounds with a seven foot wingspan can grip with its claws with an estimated strength of several hundred pounds per square inch. The spread of a golden eagle's feet is about nine inches.

In addition to their strong talons, birds of prey have extremely fast and precise dives that make it difficult if not impossible for an animal to avoid attack. Raptors are precision divers, swooping out of the sky onto their prey, and some raptors are even capable of hovering or agilely darting through foliage to capture their next meal. For example, eagles dive as fast as one hundred and fifty to two hundred miles per hour, falcons dive at over a hundred miles per hour and hawks dive at speeds up to one hundred and eighty miles an hour.

Raptors are relatively quiet when hunting since stealth is a part of their hunting tactics. Raptors may be active at any time of day or night, though owls are the most common nocturnal birds of prey while others are diurnal and will be most active when their preferred prey is active, making hunting easier Birds of prey have very keen eyesight. They locate and distinguish prey from a great distance. Only recently has it become known that birds possess more sophisticated color visual systems than we humans. While humans are trichromats, having photo-pigments with sensitivities at three peak wavelengths, birds have photo-pigments with sensitivities at four or five peak wavelengths, making them true tetrachromats, or perhaps even pentachromats. In some species, the visual spectrum extends into the ultraviolet range, once thought to be visible only to insects. It is as hard for humans to imagine how birds perceive color as it is for a colorblind person to imagine full color vision; it is outside of the human experience. For example, some species we see as having identical male and female plumage differ when seen in the ultraviolet range—a difference apparent to the birds themselves. This impacts the study of bird behavior, and our understanding of how birds of prey hunt prey for food.

As to their prey, they don't distinguish between a wild creature and a domestic pet. Therefore, for all these reasons pet owners fear for their pets when raptors are in the area.

SUMMARY

The present invention is a protective garment specifically designed based on a raptor's eyesight and hunting patterns. The protective garment, which may be in the form of a vest comprising a central portion with flaps extending from opposite dices of the central portion. The garment may be fastened together around the chest and stomach of the animal A collar portion may be part of the garment to cover and protect the neck and perhaps part of the head. The garment may be single or multi-layered. But what is common is that the outer surface of the garment is made of a material that comprises an array having a plurality cells separated by a grid. Further, the material is reflective, iridescent and/or may be a holographic material applied to a fabric or other type of substrate. Because of the characteristics of the bird's eyesight, the reflective material confuses the bird and makes an animal that is wearing the garment such a small pet invisible to the raptor. In addition, for times of day when there is low light, such as cloudy days, dusk, dawn and nighttime, the garment has removably attached lights, such as LED lights, that illuminate the garment thereby activating the reflective or holographic material. The light reflected from the garment when it is naturally illuminated (during the time periods of sun shine or high light) and from the LED light illuminated garment is menacing to most birds of prey. In particular, the iridescent material and holographic material shimmer and shine either naturally illuminated or the LED light illuminated, causing the birds of prey to be disoriented and not see the pet as prey.

[Describe the Invention as in the Claims]

BRIEF DESCRIPTION OF DRAWINGS

These and other features, aspects and advantages of the system will become better understood with regards to the following description, appended claims and accompanying drawings wherein:

DETAILED DESCRIPTION OF SYSTEM

Before describing selected embodiments of the present disclosure in detail, it is to be understood that the present disclosure is not limited to the particular embodiments described herein. The disclosure and description herein is illustrative and explanatory of one or more presently preferred embodiments of the disclosure and variations thereof, and it will be appreciated by those skilled in the art that various changes in the design, organization, order of operation, means of operation, equipment structures and location, methodology, and use of mechanical equivalents may be made without departing from the spirit of the disclosure.

As well, it should be understood the drawings are intended illustrate and plainly disclose presently preferred embodiments of the disclosure to one of skill in the art, but are not intended to be manufacturing level drawings or renditions of final products and may include simplified conceptual views as desired for easier and quicker understanding or explanation of the disclosure. As well, the relative size and arrangement of the components may differ from that shown and still operate within the spirit of the disclosure as described throughout the present application.

Moreover, it will be understood that various directions such as "upper", "lower", "bottom", "top", "left", "right", "horizontal", "vertical", "upward", "downward" and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Figure 2:
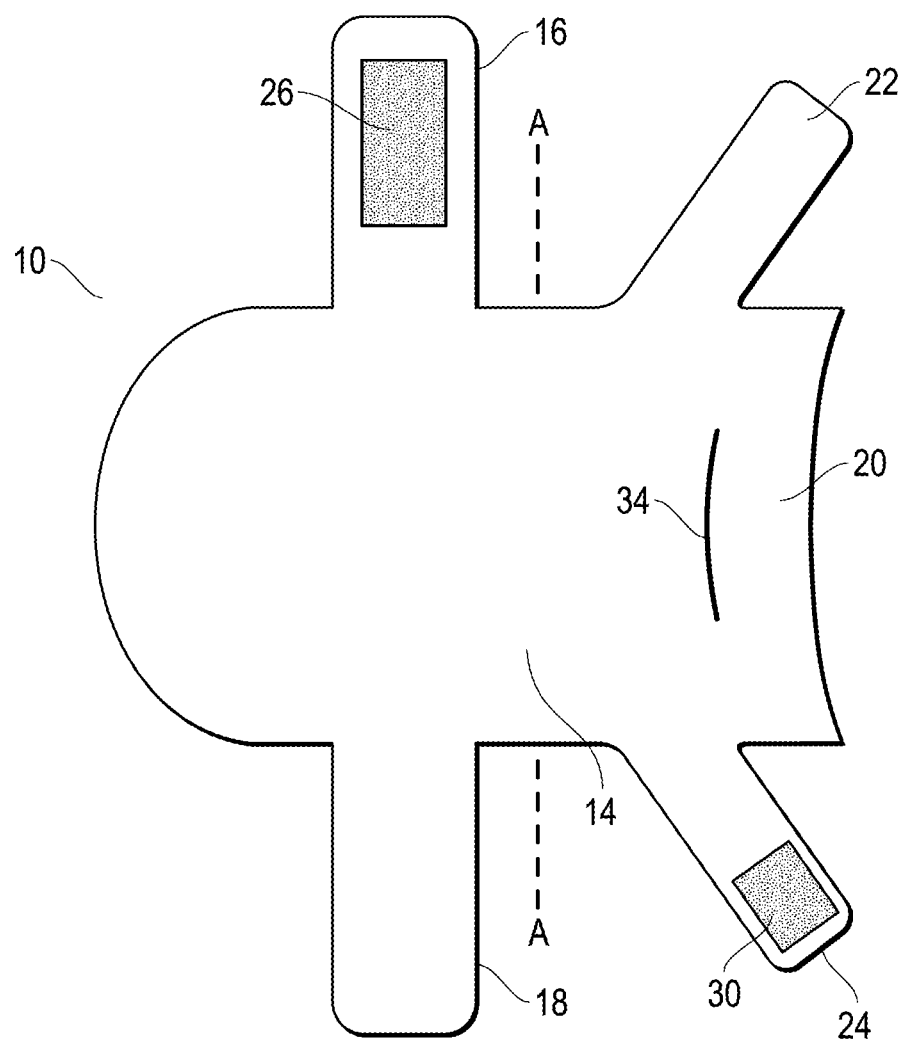
FIG. 2 is a top plan view of a first embodiment of the protective garment of FIG. 1.
Figure 3:
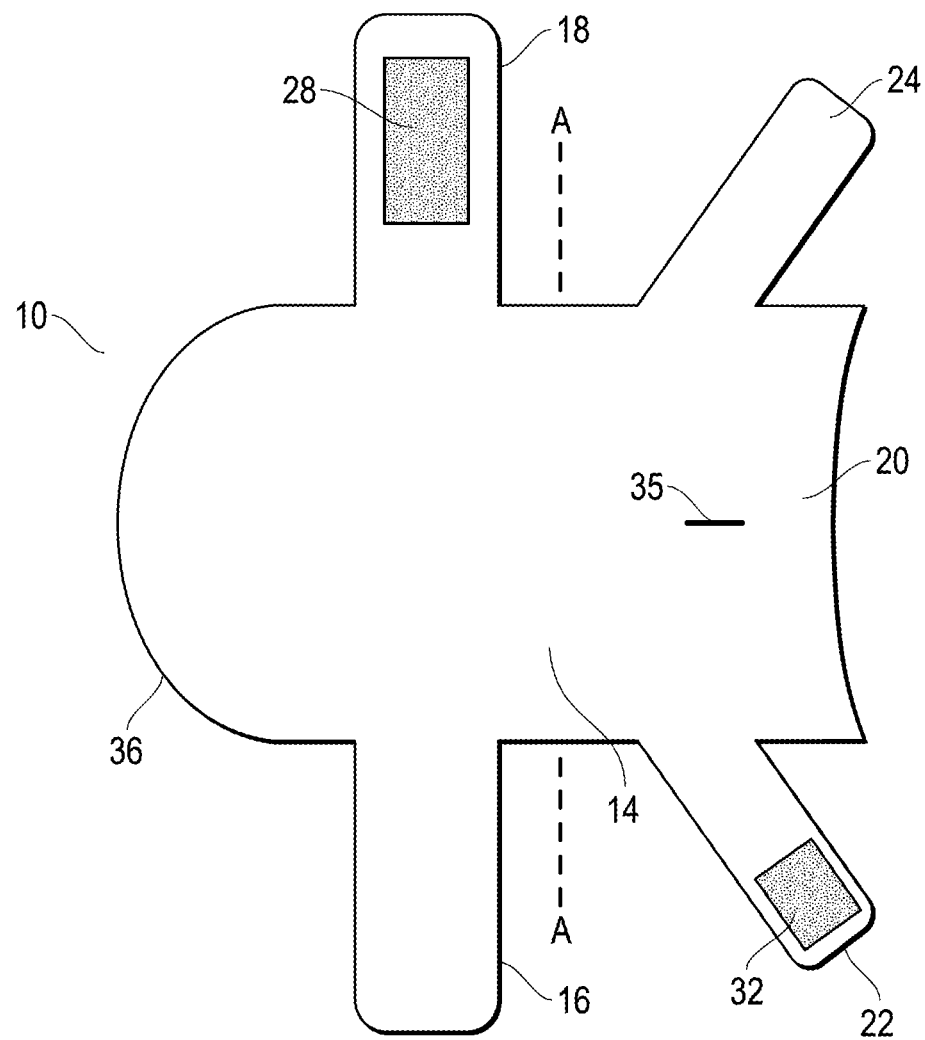
FIG. 3 is a bottom plan view of the embodiment of the protective garment of FIG. 2.
Figure 4:
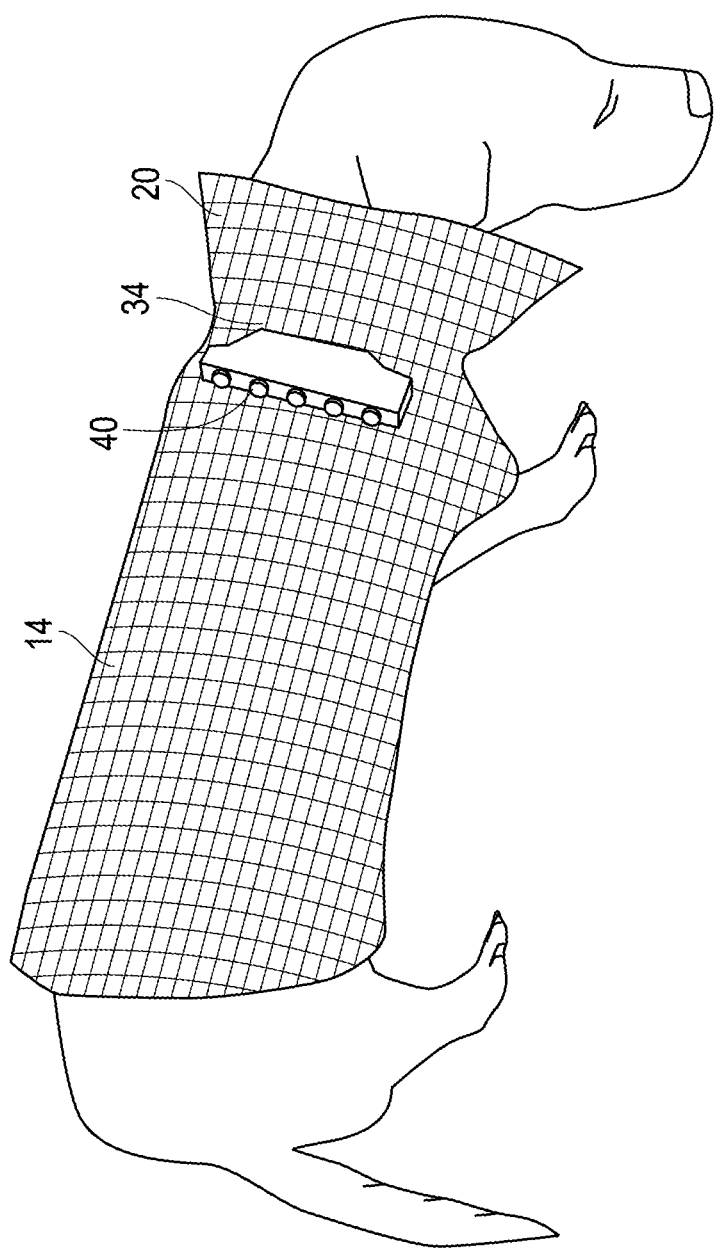
FIG. 4 is a top perspective view of one embodiment of the protective garment worn by an exemplary animal.

Referring now the drawings, an embodiment of a protective garment 10 for an animal is shown in the figures. Although in FIGS. 1, 4 and 6 the garment is shown on a dog, the garment may be worn by many different types of animals with four legs, or two arms and two legs, including but not limited to cats. It could also be worn by pet birds, including but not limited to parrots or macaws. The embodiment of the garment 10, includes a central portion 14 designed to cover an animal's body and a left flap 16 and a right flap 18 extending from the central portion 14 approximately parallel to the longitudinal axis A-A and the straps being substantially perpendicular to the central portion 14 of the garment. When the garment is worn by an animal, the flaps 16 and 18 are designed to encircle an animal's body and secure the garment to the animal. The flaps have fasteners 26 and 28, which may be made of a fastening material such as Velcro® (VELCRO is a registered trademark of Velcro Industries B.V.) to secure the garment around the animal. A collar/neck piece 20 protrudes from one part of the central portion 14 and is designed to cover the neck of the animal when it is worn. A left collar flap 22 and a right collar flap 24 protrude from the respective ends of the collar piece 20. The collar flaps 22 and 24 have fasteners 30 and 32, which may be made of a fastening material such as Velcro to secure the garment around the neck of animal. In the exemplary embodiment shown in FIGS. 1, 2 and 3, the left flap 16 goes abound around the dog's back and stomach and the right flap 18 goes around the dog's back and stomach with the right flap 18 going over and removably attaching to the left strap 16 by means of the fasteners 26 and 28. In the exemplary embodiment shown in FIGS. 1 and 2, the left collar flap 22 goes around the dog's neck and the right collar flap 24 goes around the neck with the left collar flap 22 going over and removably attaching to the right collar strap 30 by means of the fasteners 24 and 32. There is no requirement that the fasteners be applied to the right or left side of the garment, that is, the location of fasteners may be reversed. As shown in FIG. 2, there is an opening 34 that forms a small pocket near the neck 20 of the garment that allows battery powered lights, such as LED lights, to be removably attached to the garment to illuminate the garment (as shown in FIG. 4, 40). As shown in FIG. 3, there is an opening 35 on the underside 36 of the garment that also forms a pocket that holds the lights.

Figure 1:
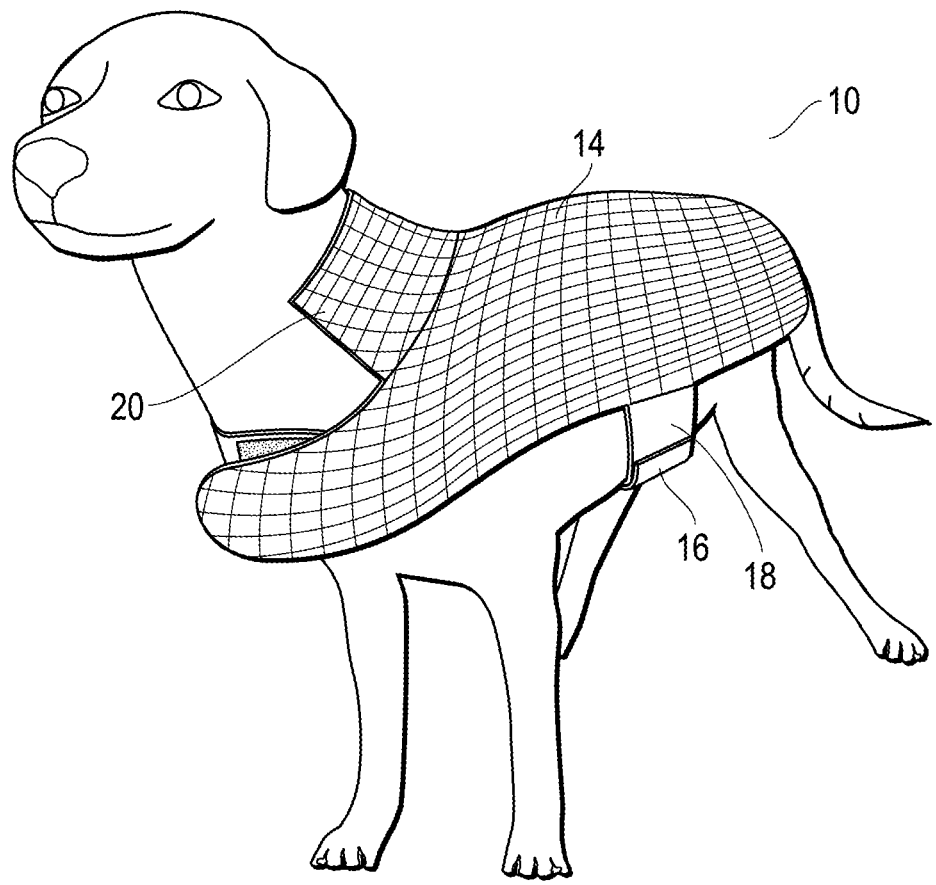
FIG. 1 is a perspective view of one embodiment of the protective garment worn by an exemplary animal.
Figure 5:
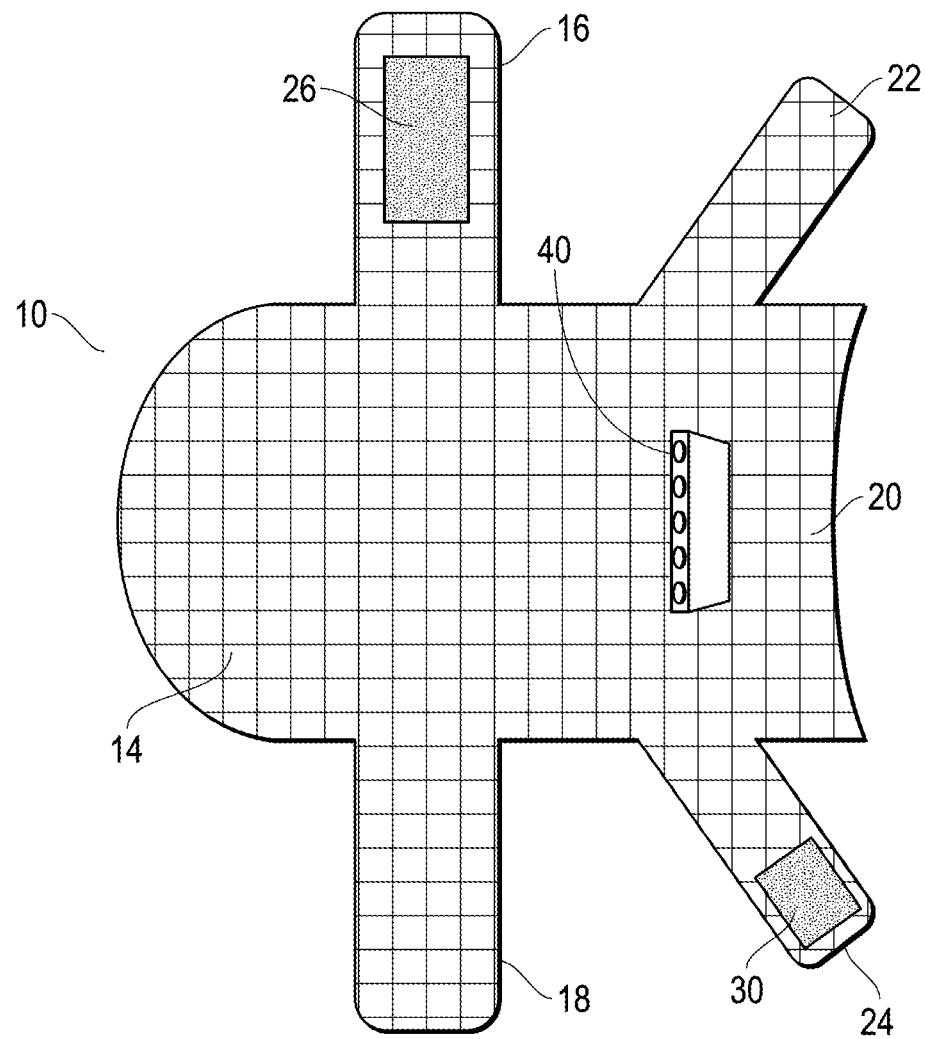
FIG. 5 a top plan view of a first embodiment of the protective garment of FIG. 1.

FIG. 5 shows FIG. 5 a top plan view of a first embodiment of the protective garment of FIG. 1 shown with the removable battery powered lights 40.

Figure 6:
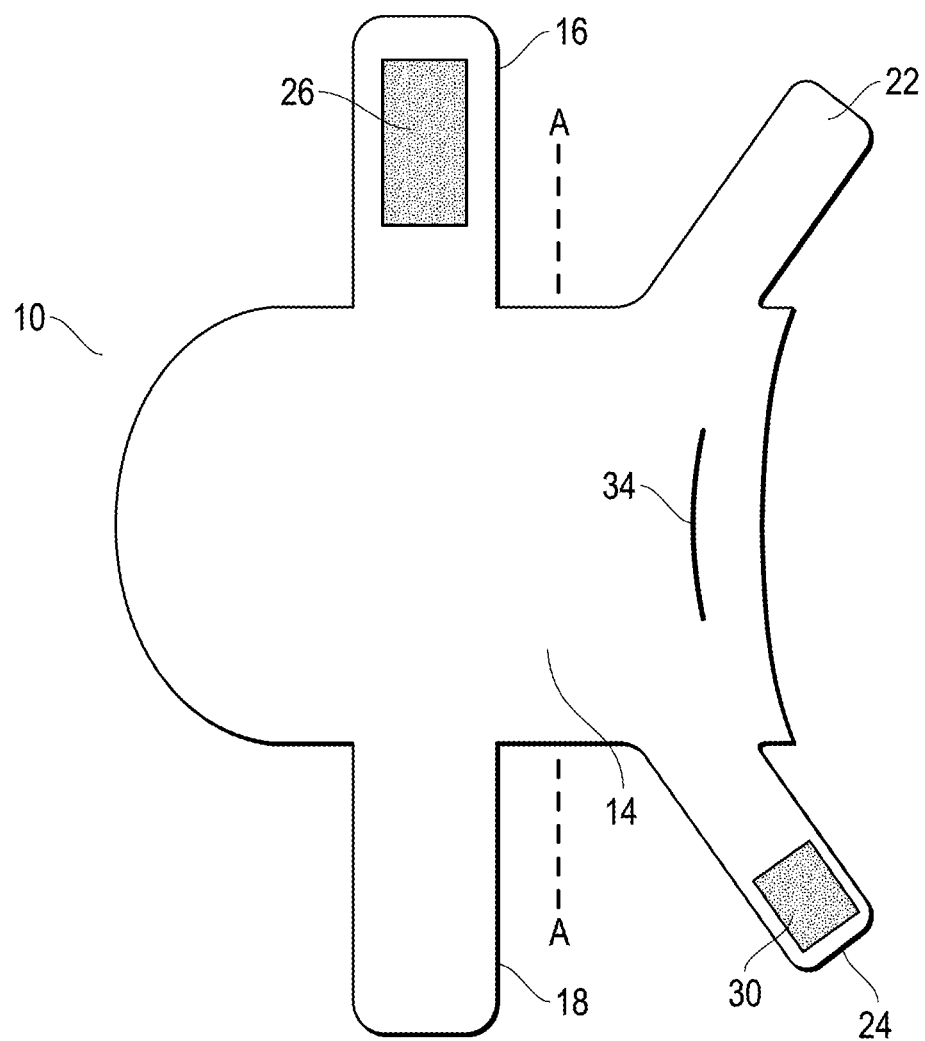
FIG. 6 is a top plan view of a second embodiment of the protective garment.

FIG. 6 is a top plan view of a second embodiment of the protective garment.

Figure 7:
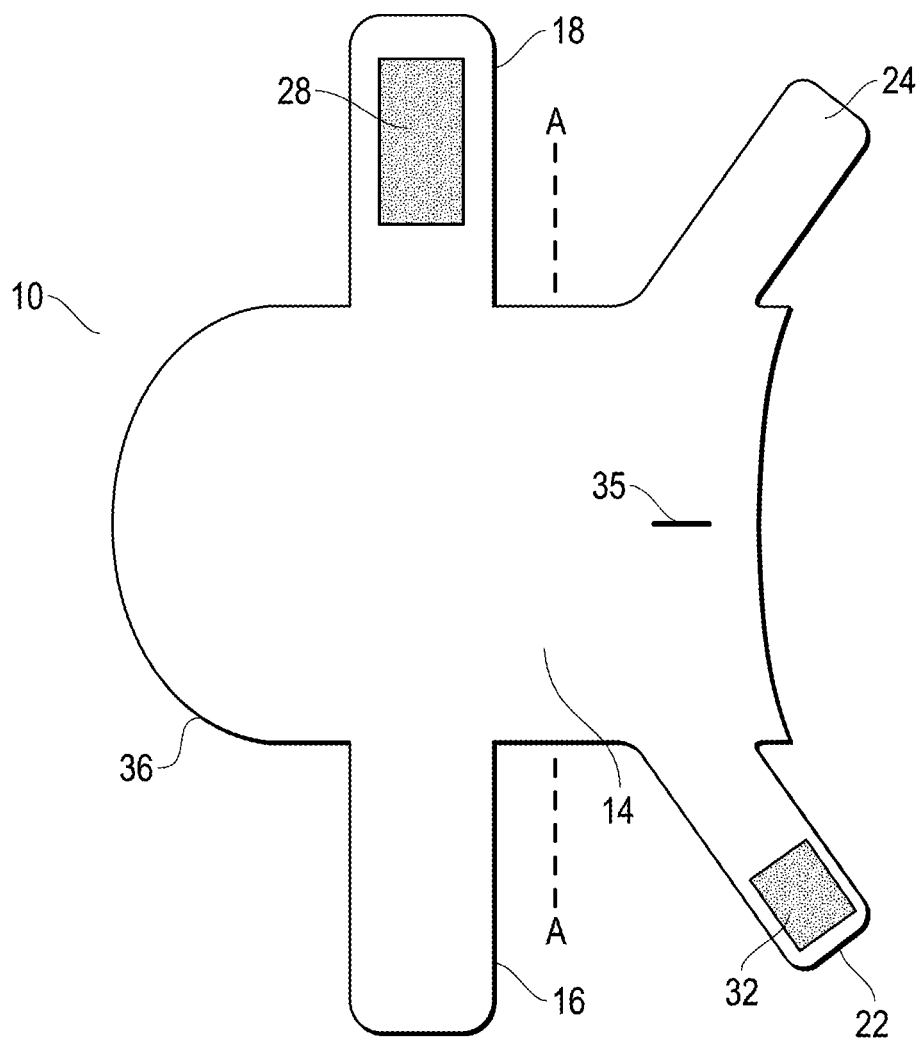
FIG. 7 is a bottom plan view of a second embodiment of the protective garment of FIG. 6.

FIG. 7 is a bottom plan view of a second embodiment of the protective garment of FIG. 6.

As shown in FIGS. 6 and 7, the flaps have fasteners 26 and 28, which may be made of a fastening material such as Velcro® (VELCRO is a registered trademark of Velcro Industries B.V.) to secure the garment around the animal. A left collar flap 22 and a right collar flap 24 protrude from the respective ends of the body 14 of the garment. The collar flaps 22 and 24 have fasteners 30 and 32, which may be made of a fastening material such as Velcro to secure the garment around the neck of animal.

Although the embodiments described above have been shown and described in considerable detail with respect to only a few exemplary embodiments thereof, it should be understood by those skilled in the art that it is not intended to be limited to these embodiments since various modifications, omissions and additions may be made to the disclosed embodiments without materially departing from the novel teachings and advantages. The directions in which the flaps are folded could differ from those shown and the lengths of the flaps may vary. For example, the flaps 18 and the short flap 16 could be of equal length or differ in length and fasten on top of the animal's back rather than on the underside. The collar 20 and/or the collar flaps 22 and 24 may be omitted. Accordingly, it is intended to cover all such modifications, omission, additions and equivalents as may be included within the spirit and scope of a pressure-applying garment and associated methods as defined by the following claims. What has been described and illustrated herein is an embodiment of the disclosure along with some of its variations. The terms, descriptions and figures used herein are set forth by way of illustration only and are not meant as limitations. Those skilled in the art will recognize that many variations are possible within the spirit and scope of the disclosure in which all terms are meant in their broadest, reasonable sense unless otherwise indicated. Any headings utilized within the description are for convenience only and have no legal or limiting effect.

While the disclosed subject matter has been described with respect to a limited number of embodiments, the specific features of one embodiment should not be attributed to other embodiments of the disclosed subject matter. No single embodiment is representative of all aspects of the disclosed subject matter. Moreover, variations and modifications therefrom exist. For example, the disclosed subject matter described herein may comprise other components. Various additives may also be used to further enhance one or more properties. In some embodiments, the disclosed subject matter is substantially free of any additive not specifically enumerated herein. Some embodiments of the disclosed subject matter described herein consist of or consist essentially of the enumerated components. In addition, some embodiments of the methods described herein consist of or consist essentially of the enumerated steps. The claims to be appended later intend to cover all such variations and modifications as falling within the scope of the disclosed subject matter.

What is claimed is:

1. A protective garment, the protective garment comprising:
    a central portion having a longitudinal axis and including a front end, a rear end opposite the front end, a first side extending laterally in a first direction from the longitudinal axis and a second side extending laterally in a second direction from the longitudinal axis, the second direction opposite the first direction;
    a first flap extending in the first direction from the first side of the central portion;
    a second flap extending in the second direction from the second side of the central portion;
    wherein the first flap and the second flap each have an inside surface adapted to contact an animal and an outside surface adapted to face away from the animal, wherein the first flap and the second flap are extendable around a body of the animal and fasten to each other;
    a first collar flap extending from the front end of the central portion, the first collar flap including a free distal end and two opposing edges that with the free distal end of the first collar flap form a portion of the perimeter of the garment;
    a second collar flap extending from the front end of the central portion laterally spaced in the second direction from the first collar flap, the second collar flap including a free distal end and two opposing edges that with the free distal end of the second collar flap form a portion of the perimeter of the garment;
    wherein the first collar flap and the second collar flap each have an inside surface adapted to contact the animal and an outside surface adapted to face away from the animal, wherein the first collar flap and the second collar flap are extendable around a neck of the animal and fasten to each other; and
    wherein the central portion comprises an outer surface that comprises an array having a plurality of cells separated by a grid, wherein each of the plurality of cells comprises an iridescent material that shimmers in light in a manner that disorients and confuses a tetrachromatic bird of prey to render the animal wearing the protective garment substantially invisible to the bird of prey and substantially prevent the bird of prey from attacking the animal.

2. The protective garment of claim 1 further comprising an opening in the central portion and battery powered lights removably installed in the opening wherein at least a portion of the iridescent material is illuminated in low light condition when the battery powered lights are installed in the opening of the garment and activated.

3. The protective garment of claim 2 wherein the battery powered lights are LED lights.

4. The protective garment of claim 1 wherein the first flap and the second flap each have an inside surface adapted to contact the animal and an outside surface adapted to face away from the animal, wherein the first flap and the second flap are extendible around the body of the animal and fasten to each other with hook and loop fasteners, wherein the inside surface of the first flap includes a hook section of fastener and a loop section of fastener, and wherein the outside surface of the second flap includes a hook section of fastener and a loop section of fastener.

5. The protective garment of claim 1 wherein the first collar flap and the second collar flap each have an inside surface adapted to contact the animal and an outside surface adapted to face away from the animal, wherein the first collar flap and the second collar flap are extendible around the neck of the animal and fasten to each other with hook and loop fasteners, wherein the inside surface of the first collar flap includes a hook section of fastener and a loop section of fastener, and wherein the outside surface of the second collar flap includes a hook section of fastener and a loop section of fastener.

6. A protective garment for an animal, the garment comprising:
    a central portion having a longitudinal axis and including a front end, a rear end opposite the front end, a first side extending laterally in a first direction from the longitudinal axis and a second side extending laterally in a second direction from the longitudinal axis, the second direction opposite the first direction;
    a first flap extending in the first direction from the first side of the central portion;
    a second flap extending in the second direction from the second side of the central portion;
    wherein the first flap and the second flap each have an inside surface adapted to contact an animal and an outside surface adapted to face away from the animal, wherein the first flap and the second flap are extendable around a body of the animal and fasten to each other; and
    wherein the central portion is comprised of an array having a plurality of cells separated by a grid, wherein each of the plurality of cells comprises an iridescent material that shimmers, in light in a manner that disorients and confuses a tetrachromatic bird of prey to render the animal wearing the protective garment substantially invisible to the bird of prey and substantially prevent the bird of prey from attacking the animal.

7. The protective garment of claim 6 further comprising an opening in the central portion and battery powered lights removably installed in the opening wherein at least a portion of the iridescent material is illuminated in low light condition when the battery powered lights are installed in the opening of the garment and activated.

8. The protective garment of claim 7 wherein the battery powered lights are LED lights.

9. The protective garment of claim 6 wherein the first flap and the second flap each have an inside surface adapted to contact the animal and an outside surface adapted to face away from the animal, wherein the first flap and the second flap are extendible around the body of the animal and fasten to each other with hook and loop fasteners, wherein the inside surface of the first flap includes a hook section of fastener and a loop section of fastener, and wherein the outside surface of the second flap includes a hook section of fastener and a loop section of fastener.

10. A protective garment, the protective garment comprising:
    a central portion having a longitudinal axis and including a front end, a rear end opposite the front end, a first side extending laterally in a first direction from the longitudinal axis and a second side extending laterally in a second direction from the longitudinal axis, the second direction opposite the first direction;
    a first flap extending in the first direction from the first side of the central portion;
    a second flap extending in the second direction from the second side of the central portion;
    wherein the first flap and the second flap each have an inside surface adapted to contact an animal and an outside surface adapted to face away from the animal, wherein the first flap and the second flap are extendable around a body of the animal and fasten to each other;

a first collar flap extending from the front end of the central portion, the first collar flap including a free distal end and two opposing edges that with the free distal end of the first collar flap form a portion of the perimeter of the garment;

a second collar flap extending from the front end of the central portion laterally spaced in the second direction from the first collar flap, the second collar flap including a free distal end and two opposing edges that with the free distal end of the second collar flap form a portion of the perimeter of the garment;

wherein the first collar flap and the second collar flap each have an inside surface adapted to contact the animal and an outside surface adapted to face away from the animal, wherein the first collar flap and the second collar flap are extendable around a neck of the animal and fasten to each other; and wherein the central portion comprises an outer surface having an array of iridescent cells separated by a grid.

11. The protective garment of claim 10, wherein each iridescent cell within the array of iridescent cells comprises an iridescent material that shimmers in light in a manner that disorients and confuses a tetrachromatic bird of prey to render the animal wearing the protective garment substantially invisible to the bird of prey and substantially prevent the bird of prey from attacking the animal.

12. The protective garment of claim 10, wherein a majority of the iridescent cells within the array of iridescent cells are substantially the same size.

13. The protective garment of claim 12, wherein a majority of the iridescent cells within the array of iridescent cells are substantially the same shape.

14. The protective garment of claim 10, wherein the opaque grid is non-iridescent.

15. The protective garment of claim 10, wherein at least a portion of the array of iridescent cells comprises a regular pattern of similarly sized and shaped iridescent cells.

16. The protective garment of claim 10, further comprising an external light source affixed to the outer surface of the garment and configured to illuminate at least a portion of the iridescent cells.

17. The protective garment of claim 16, wherein the external light source is removably engaged with the garment.

* * * * *